(12) United States Patent
Kawai

(10) Patent No.: US 9,982,843 B2
(45) Date of Patent: May 29, 2018

(54) SYSTEMS AND METHODS FOR MAINTAINING PRESSURE IN CRYOGENIC STORAGE TANKS

(71) Applicant: The Boeing Company, Seal Beach, CA (US)

(72) Inventor: Ronald Tatsuji Kawai, Rancho Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 196 days.

(21) Appl. No.: 13/936,555

(22) Filed: Jul. 8, 2013

(65) Prior Publication Data

US 2015/0007585 A1    Jan. 8, 2015

(51) Int. Cl.
*F17C 9/02* (2006.01)
*F17C 6/00* (2006.01)
(Continued)

(52) U.S. Cl.
CPC ............... *F17C 6/00* (2013.01); *B64D 37/30* (2013.01); *F17C 9/02* (2013.01); *F17C 13/005* (2013.01); *F17C 13/025* (2013.01); *F17C 2201/054* (2013.01); *F17C 2221/012* (2013.01); *F17C 2221/033* (2013.01); *F17C 2223/0161* (2013.01); *F17C 2223/033* (2013.01); *F17C 2250/0434* (2013.01); *F17C 2250/0491* (2013.01); *F17C 2250/0626* (2013.01);
(Continued)

(58) Field of Classification Search
CPC ............ F17C 2265/03; F17C 2265/032; F17C 2265/033; F17C 2265/034; F17C 2265/037; F17C 2265/038; F17C 2227/0341–2227/0346; F17C 2227/0358–2227/0362; F17C 9/02; F17C 9/04; F25J 1/0022; F25J 1/0025
USPC .................................................... 62/48.1, 48.2
See application file for complete search history.

(56) References Cited

U.S. PATENT DOCUMENTS 1,968,504 A * 7/1934 Rufener et al. ................ 62/48.2
2,242,299 A * 5/1941 Harrington et al. ........... 62/48.2
(Continued)

FOREIGN PATENT DOCUMENTS

GB          2364553     *    1/2002

OTHER PUBLICATIONS

Frank et al., Development of a Cryocooler to Provide Zero Boil-Off of a Cryogenic Propellant Tank, International Cryocooler Conference, Inc., dated 2007, pp. 583-588.
(Continued)

*Primary Examiner* — Eric Ruppert
(74) *Attorney, Agent, or Firm* — Gates & Cooper LLP

(57) ABSTRACT

A system for maintaining a substantially constant pressure within an ullage space of a cryogenic storage tank is provided. The system includes a compressor configured to receive fuel gas from the cryogenic storage tank, and compress the fuel gas to produce heated fuel gas. The system further includes a heat exchanger in flow communication with the compressor and configured to cool the heated fuel gas to produce cooled fuel gas, and a turbine in flow communication with the heat exchanger and configured to expand the cooled fuel gas to produce a gas and liquid mixture having a predetermined liquid to gas ratio, and discharge the gas and liquid mixture into the cryogenic storage tank.

11 Claims, 2 Drawing Sheets

(51) Int. Cl.
*F17C 13/02* (2006.01)
*F17C 13/00* (2006.01)
*B64D 37/30* (2006.01)

(52) U.S. Cl.
CPC .......... *F17C 2250/0689* (2013.01); *F17C 2265/033* (2013.01); *F17C 2265/037* (2013.01); *F17C 2265/066* (2013.01); *F17C 2270/0189* (2013.01); *Y02E 60/321* (2013.01)

(56) References Cited

U.S. PATENT DOCUMENTS

| | | | | |
|---|---|---|---|---|
| 2,682,154 | A | * | 6/1954 | Wilkinson ............... 62/48.2 |
| 2,944,405 | A | * | 7/1960 | Basore et al. ............. 62/48.2 |
| 2,976,695 | A | * | 3/1961 | Meade ...................... 62/48.2 |
| 3,319,432 | A | * | 5/1967 | Nebgen ..................... 62/48.2 |
| 3,885,394 | A | * | 5/1975 | Witt et al. ................... 60/651 |
| 4,951,475 | A | * | 8/1990 | Alsenz .................. F25B 49/022 417/7 |
| 5,415,196 | A | * | 5/1995 | Bryant ............ B60K 15/03504 137/14 |
| 2001/0042376 | A1 | * | 11/2001 | Johnson et al. .............. 62/48.2 |
| 2002/0083719 | A1 | * | 7/2002 | Hughes .................. F17C 5/02 62/49.1 |
| 2005/0217281 | A1 | * | 10/2005 | Adler et al. ................... 62/48.2 |
| 2011/0056238 | A1 | * | 3/2011 | Mak ............................. 62/614 |

OTHER PUBLICATIONS

Moon et al., Cryogenic Refrigeration Cycle for Re-Liquefaction of LNG Boil-Off Gas, International Cryocooler Conference, Inc., dated 2007, pp. 629-635.

Hamworthy, LNG Systems for Marine Application LNG Reliquefaction & LNG Regasification, retrieved Jul. 8, 2013, pp. 8.

* cited by examiner

SYSTEMS AND METHODS FOR MAINTAINING PRESSURE IN CRYOGENIC STORAGE TANKS

BACKGROUND

The field of the disclosure relates generally to the storage and delivery of cryogenic fuels, and more specifically, to a system for maintaining a constant pressure in a cryogenic fuel tank.

The cost of petroleum-based liquid fuels has been escalating because of continuing world demand, and demand will likely continue to increase because of substantial economic growth in countries such as China and India. These countries have relatively large populations, spurring rapid expansion of ground and air transportation.

The increasing cost of petroleum-based products is due, at least in part, to a dependence on importing energy. This has resulted in numerous efforts to develop alternative energy sources to reduce costs and achieve energy independence. For example, recent advances in shale gas fracking have led to large-scale recovery of natural gas from shale rock. This abundance of natural gas has led to a decrease in the cost of natural gas, while the cost of petroleum-based fuels continues to rise. Accordingly, at least some known vehicle fuel systems utilize natural gas instead of petroleum-based fuels.

For example, liquefied natural gas may be used as a fuel for an aircraft. The liquefied natural gas may be stored in light-weight cryogenic fuel storage tanks onboard the aircraft. However, changes in altitude of the aircraft may result in pressure changes in the fuel storage tanks, causing at least a portion of the total liquefied natural gas to boil off. Accordingly, to avoid boil off, it is desirable to maintain a substantially constant pressure within the fuel storage tanks. However, as liquefied natural gas is essentially pure methane, the substantially constant pressure should not be maintained by venting liquefied natural gas into the atmosphere.

BRIEF DESCRIPTION

In one aspect, a system for maintaining a substantially constant pressure within an ullage space of a cryogenic storage tank is provided. The system includes a compressor configured to receive fuel gas from the cryogenic storage tank, and compress the fuel gas to produce heated fuel gas. The system further includes a heat exchanger in flow communication with the compressor and configured to cool the heated fuel gas to produce cooled fuel gas, and a turbine in flow communication with the heat exchanger and configured to expand the cooled fuel gas to produce a gas and liquid mixture having a predetermined liquid to gas ratio, and discharge the gas and liquid mixture into the cryogenic storage tank.

In another aspect, a cryogenic system is provided. The cryogenic system includes a storage tank and a cryo circuit in flow communication with the storage tank and configured to receive fuel gas from the storage tank, convert the fuel gas into a gas and liquid mixture having a predetermined liquid to gas ratio, and discharge the gas and liquid mixture into the storage tank.

In yet another aspect, a method for maintaining a substantially constant pressure within an ullage space of a cryogenic storage tank is provided. The method includes channeling fuel gas from the cryogenic storage tank to a cryo circuit, converting, using the cryo circuit, the fuel gas into a gas and liquid mixture having a predetermined liquid to gas ratio, and discharging the gas and liquid mixture into the cryogenic storage tank such that a pressure in the ullage space remains substantially constant.

The features, functions, and advantages that have been discussed can be achieved independently in various implementations or may be combined in yet other implementations, further details of which can be seen with reference to the following description and drawings.

DETAILED DESCRIPTION

Figure 1:
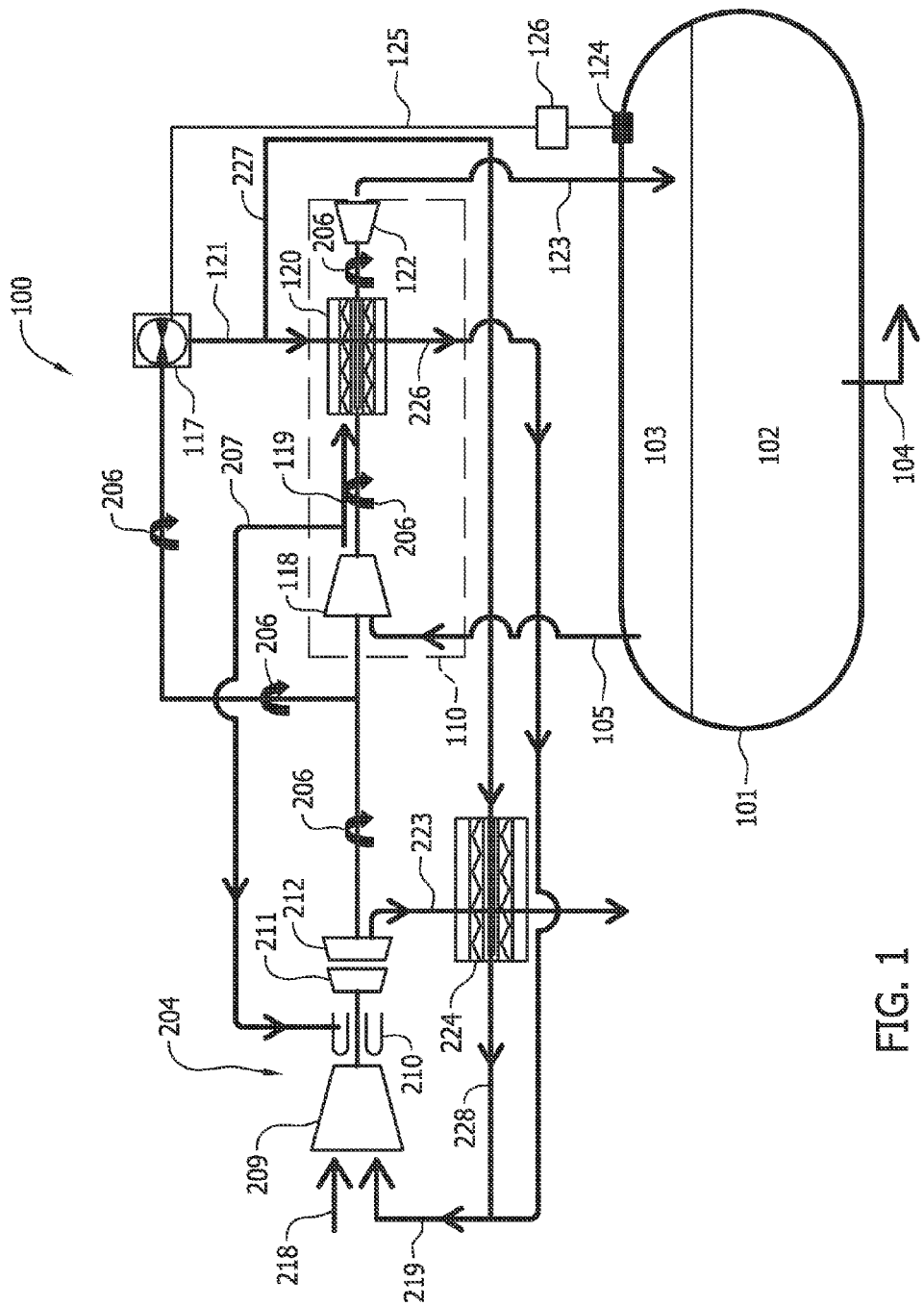
FIG. 1 is a schematic diagram of a system for maintaining a constant pressure in cryogenic fuel tank.

The systems and methods described herein enable maintaining a substantially constant pressure in an ullage space of a storage tank. Fuel gas from the storage tank is channeled to a cryo circuit that converts the fuel gas into a gas and liquid mixture. The gas and liquid mixture has a predetermined liquid to gas ratio. Further, the gas and liquid mixture is discharged into the storage tank to facilitate maintaining the substantially constant pressure.

Flight vehicles, such as airplanes, utilize fuel tanks that store and supply cryogenic fuels such as, for example, natural gas, methane, hydrogen, and/or other fuels stored as a cryogenic liquid. To facilitate minimizing payload carrying penalties, cryogenic fuel tanks should be relatively lowweight. Further, cryogenic fuel tanks should have a minimum differential pressure across tank walls. An internal tank pressure is near ambient pressure when the tank is filled on the ground. As the tank climbs to higher altitudes during flight, the ambient pressure outside of the tank drops. If the pressure inside of the fuel tank is allowed to drop, fuel within the tank will boil off, resulting in a loss of fuel.

Accordingly, to facilitate minimizing fuel loss, ullage space (i.e., the gaseous space in the tank above the liquid fuel) should be maintained at substantially the same pressure as the pressure during the filling of the tank. Further, during extended periods on the ground, heat transfer into the tank may vaporize at least some of the liquid cryogenic fuel, resulting in a pressure build up that may be relieved by venting. However, if the cryogenic fuel is liquefied natural gas that includes primarily methane, venting into the atmosphere may contribute to global warming.

During flight operations, when fuel is supplied to vehicle engines for power, the tank should be pressurized to prevent ullage space pressure collapse that would generate large compression loads on tank walls. The systems and methods described herein maintain a substantially constant pressure in the fuel tank to facilitate providing pressure relief during long term storage, preventing boil off when climbing to higher altitudes, and maintaining a positive ullage space pressure during fuel outflow. Further, at least for environmental reasons, the systems and methods described herein avoid venting into the atmosphere.

Specifically, the systems and method described herein provide a regenerative integrated pressurization and vent gas recovery system for cryogenic fuel tanks. The implementations described herein provide particular benefits for light weight cryogenic fuel tanks where a maximum differential pressure between the inside and the outside of the tank should be minimized. The systems and methods described herein also avoid the use of helium for pressurization, as helium is relatively expensive. In general, nitrogen is not used for pressurization, as it has a higher freezing temperature than some cryogenic fuels (e.g., liquid hydrogen) and thus freezes out. Further, nitrogen cannot be used for pressurization of liquid natural gas, as it has a relatively high solubility in liquefied methane and natural gas when processed into a liquid, resulting in essentially pure methane.

The implementations described herein provide a gas turbine that drives a cryo-cooler using cryogenic vent gas as a fuel to regeneratively maintain a constant ullage pressure. The fuel tank feeds into a cryo-cooler refrigeration cycle using a variable flow fan in a heat exchanger between a compressor and an expansion cooling turbine. The outflow from the turbine is a mixture of liquefied and gaseous natural gas. The systems and methods utilize a partial liquefaction cycle that continuously recycles through the fuel storage tank. A flow cooling turbine that extracts energy requires expansion of a gas through the turbine.

For liquefaction, at least some known systems use an auxiliary refrigeration cycle device such as a nitrogen expansion cycle to liquefy the vent gas. However, in the systems and methods described herein, partial liquefaction is done in expansion turbine, allowing gaseous flow expansion to extract energy while partially liquefying the turbine flow. Continuous recycling of the vent flow maintains the constant ullage pressure by the combination of liquefaction and pressurization of vent gas. The cooling flow for the liquefaction cryo-cooler is modulated to vary the heat extracted, which in turn varies a liquefaction fraction of the flow. The exemplary system is powered by regenerative combustion that utilizes a portion of the vent gas.

FIG. 1 is a schematic diagram of an exemplary system 100 for maintaining constant pressure in a thermally insulated fuel tank 101 that stores cryogenic fuel 102. In the exemplary implementation, cryogenic fuel 102 is liquefied natural gas. Alternatively, cryogenic fuel 102 may be any fuel that enables the system to function as described herein.

A ullage space 103 within fuel tank 101 above cryogenic fuel 102 is gaseous. During storage of cryogenic fuel 102, heat transfer from outside fuel tank 101 may cause at least some of cryogenic fuel 102 to vaporize, resulting in a pressure build up. When cryogenic fuel 102 flows out of fuel tank 101 through an outlet 104 (e.g., to power one or more engines), a quantity of cryogenic fuel 102 in fuel tank 101 decreases, resulting in a pressure drop.

In the exemplary implementation, where cryogenic fuel 102 is liquefied natural gas, excess pressure is not relieved by venting to the atmosphere. This is because liquefied natural gas is essentially pure methane, which may contribute to global warming. Further, venting to the atmosphere at a high altitude may result in relatively large fuel boil offs (e.g., 8 to 10% of the total fuel).

In system 100, the pressure in ullage space 103 is maintained at substantially the same pressure as a pressure when fuel tank 101 is filled with cryogenic fuel 102. Otherwise, differential pressures across walls of fuel tank 101 may become high, particularly during take-off and an initial ascent of the vehicle. Vent gas 105 from fuel tank 101 is channeled into a cryo circuit 110, and more specifically, into a cryo-cooler compressor 118 in cryo circuit 110. Vent gas 105 is compression heated in cryo-cooler compressor 118 to produce heated vent gas 119 and then channeled to and cooled in a first heat exchanger 120.

To cool vent gas 105, a variable flow fan 117 provides cooled air 121 to first heat exchanger 120. After being cooled in first heat exchanger 120, vent gas 105 is expanded and partially sub-cooled into a liquid in an energy extraction turbine 122. Energy extraction turbine 122 outputs a gas and liquid mixture 123 that is channeled back into fuel tank 101. Accordingly, cryo-cooler compressor 118, first heat exchanger 120, and energy extraction turbine 122 form cryo circuit 110 that converts vent gas 105 from fuel tank 101 into gas and liquid mixture 123 that is returned to fuel tank 101.

Gas and liquid mixture 123 has a predetermined ratio of liquid to gas that facilitates maintaining the pressure in ullage space 103, as described in detail below.

In the exemplary implementation, a differential pressure sensor 124 monitors the pressure of ullage space 103. Depending on whether the pressure of ullage space 103 is increasing or decreasing, a signal 125 is transmitted by a controller 126 to variable flow fan 117 to increase or decrease the cooling of vent gas 105. Controller 126 is communicatively coupled to differential pressure sensor 124.

Specifically, if the pressure of ullage space 103 is increasing, controller 126, via signal 125, instructs variable flow fan 117 to increase a cooling flow to increase cooling of vent gas 105, resulting in an increase in the liquid to gas ratio (i.e., an increase in the amount of liquid and a decrease in the amount of gas) in mixture 123, which in turn decreases the pressure of ullage space 103. On the other hand, if the pressure of ullage space 103 is decreasing, controller 126, via signal 125, instructs variable flow fan 117 to decrease the cooling flow to decrease cooling of vent gas 105, resulting in a decrease of the liquid to gas ratio (i.e., a decrease in the amount of liquid and an increase in the amount of gas) in mixture 123, which in turn increases the pressure of ullage space 103.

In the exemplary implementation, differential pressure sensor 124 determines that the pressure of ullage space 103 is increasing if the measured pressure is above a predetermined upper threshold, and differential pressure sensor 124 determines that the pressure of ullage space 103 is decreasing if the measured pressure is below a predetermined lower threshold. The predetermined upper and lower thresholds define a pressure range that ullage space 103 operates within. For example, in one implementation, the pressure is maintained at approximately 3.0 pounds per square inch above atmospheric pressure (i.e., approximately 17.7 pounds per square inch), with the lower threshold set at 17.2 pounds per square inch and the upper threshold set at 18.2 pounds per square inch. Alternatively, differential pressure sensor 124 may determine that the pressure of ullage space 103 is increasing or decreasing using any techniques that enable system 100 to function as described herein.

A gas turbine 204 provides shaft power 206 to a plurality of components in system 100, as described herein. For example, gas turbine 204 provides shaft power 206 to at least cryo-cooler compressor 118, variable flow fan 117, and energy extraction turbine 122 in the exemplary implementation. Gas turbine 204 is fueled by a portion 207 of heated vent gas 119 that is bled off before entering first heat exchanger 120. Gas turbine 204 includes a compressor 209, a combustor 210, a first turbine 211, and a second turbine 212. The portion 207 of heated vent gas 119 is supplied to combustor 210.

Compressor 209 receives ambient air 218 and heated air 219. The compressed air is then burned in combustor 210 to produce energy in the form of high temperature combustion products. The high energy burned air is expanded in first turbine 211 to drive compressor 209. Any excess high energy air is expanded in second turbine 212 to produce shaft power 206. An output 223 of second turbine 212 has a temperature higher than the atmosphere. Accordingly, output 223 is passed through a second heat exchanger 224 to generate first hot air 228 included in heated air 219.

In the exemplary implementation, at least a portion 227 of cooling air 121 from variable flow fan 117 passes through second heat exchanger 224 to generate first hot air 228. Further, second hot air 226 output from first heat exchanger 120 also contributes to heated air 219. Accordingly, waste heat from both gas turbine 204 and first heat exchanger 120 is recovered to facilitate improving an efficiency of gas turbine 204 by regeneration.

System 100 maintains the pressure of ullage space 103 within a relatively narrow pressure range by generating gas and liquid mixture 123 from vent gas 105 using a closed loop. System 100 consumes a relatively small amount of fuel 102 for power, and releases a relatively low amount of carbon dioxide into the atmosphere. Further the regenerative cycle of system 100 has a relatively high efficiency. As described herein, system 100 facilitates maintaining a substantially constant pressure in ullage space 103 of fuel tank 101 during substantial changes in altitude.

Figure 2:
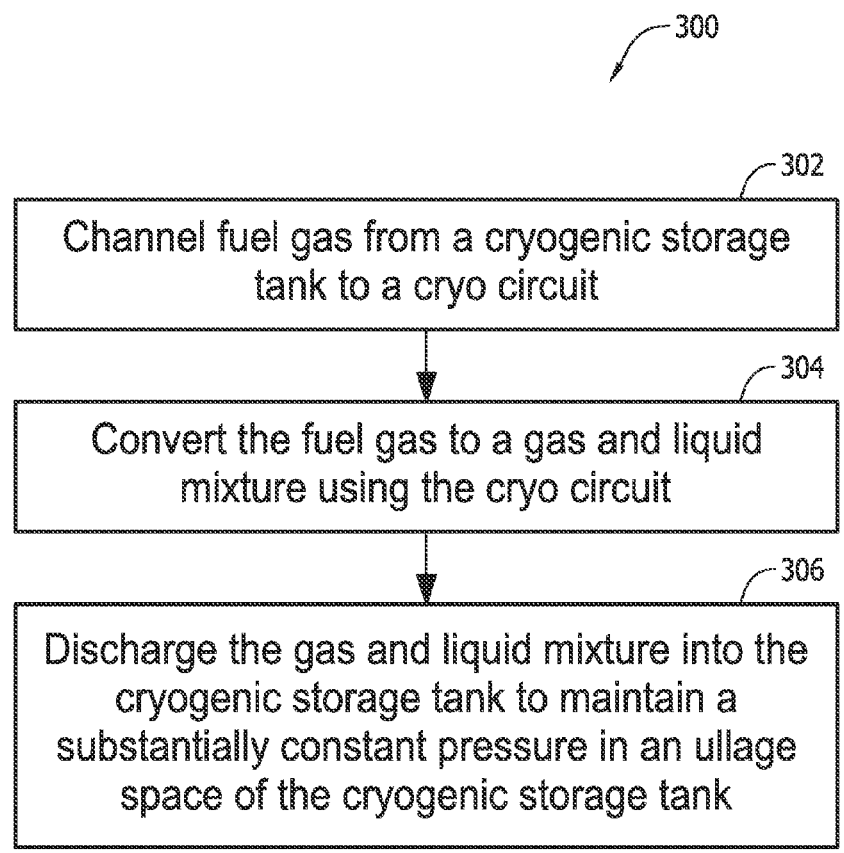
FIG. 2 is a flowchart of an exemplary method that may be used with the system shown in FIG. 1.

FIG. 2 is a flowchart of an exemplary method 300 for maintaining a substantially constant pressure within a ullage space of a cryogenic storage tank, such as ullage space 103 in fuel tank 101 (both shown in FIG. 1). Fuel gas, such as vent gas 105 (shown in FIG. 1), is channeled 302 from the cryogenic storage tank to a cryo circuit, such as cryo circuit 110 (shown in FIG. 1). The cryo circuit converts 304 the fuel gas into a gas and liquid mixture, such as gas and liquid mixture 123 (shown in FIG. 1). The gas and liquid mixture has a predetermined liquid to gas ratio. The gas and liquid mixture is discharged 306 into the cryogenic storage tank such that a pressure in the ullage space remains substantially constant.

In the exemplary implementation, the cryo circuit converts 304 the fuel gas by compressing the fuel gas into heated fuel gas in a compressor, such as cryo-cooler compressor 118 (shown in FIG. 1), cooling the heated fuel gas into cooled fuel gas in a heat exchanger, such as first heat exchanger 120 (shown in FIG. 1), and expanding the cooled fuel gas in a turbine, such as energy extraction turbine 122 (shown in FIG. 1). In the exemplary implementation, a power turbine, such as gas turbine 204 (shown in FIG. 1), powers at least one of the compressor and the turbine. The power turbine operates using a portion of the heated fuel gas.

A cooling flow from a fan, such as variable flow fan 117 (shown in FIG. 1), is channeled through the heat exchanger to cool the heated fuel gas. To control the pressure within the ullage space, the pressure can be monitored using a sensor, such as differential pressure sensor 124 (shown in FIG. 1). To maintain the pressure, when the monitored pressure increases, the cooling flow from the fan is increased, and when the monitored pressure decreases, the cooling flow from the fan is decreased.

The systems and methods described herein facilitate maintaining a constant pressure in a cryogenic storage tank by using closed loop recycling of vent gas using a cryo-cooler and partial liquefaction in a expansion turbine. The systems and methods described herein do not utilize atmospheric venting for pressure relief during storage or to account for pressure drops when discharging fuel out of a tank. Moreover, the systems and methods described herein utilize a regenerative cycle to recover heat from a gas turbine and the cryo-cooler to improve the thermodynamic efficiency of the gas turbine. Shaft power generated by the gas turbine drives one or more components in the system.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for maintaining a substantially constant pressure within an ullage space of a cryogenic storage tank, said system comprising:
    a compressor configured to:
        receive fuel gas from the cryogenic storage tank; and
        compress the fuel gas to produce heated fuel gas;
    a first heat exchanger in flow communication with said compressor and configured to cool the heated fuel gas to produce cooled fuel gas;
    an energy extraction turbine in flow communication with said first heat exchanger and configured to:
        expand the cooled fuel gas to produce a gas and liquid mixture having a predetermined liquid to gas ratio; and
        discharge the gas and liquid mixture into the cryogenic storage tank;
    a second heat exchanger to generate second heat exchanger heat from power turbine waste heat;
    a fan configured to provide a cooling flow to said first heat exchanger and thereafter, said second heat exchanger, the cooling flow heated by the first heat exchanger to generate first heat exchanger waste heat;
    a power turbine configured to power at least one of the compressor, the energy extraction turbine and the fan at least in part using the first heat exchanger waste heat and second heat exchanger heat;
    a differential pressure sensor configured to monitor a differential pressure across walls of the cryogenic storage tank;
    a controller communicatively coupled between said differential pressure sensor and said fan, said controller configured to control cooling of the heated fuel gas to achieve the predetermined liquid to gas ratio by transmitting signals to said fan that cause said fan to at least one of increase and decrease the cooling flow; and
    wherein the power turbine is configured to receive a portion of the heated fuel gas downstream from the compressor.

2. The system in accordance with claim 1, wherein said controller is configured to:
    instruct said fan to increase the cooling flow when the pressure in the ullage space increases; and
    instruct said fan to decrease the cooling flow when the pressure in the ullage space decreases.

3. The system in accordance with claim 1, wherein the fuel gas is natural gas.

4. The system in accordance with claim 1, wherein said controller is configured to:

receive signals from said differential pressure sensor;
determine, from the received signals, whether the pressure within the ullage space is increasing or decreasing; and
transmit signals to said fan based on the determination.

5. A cryogenic system comprising:
a storage tank; and
a cryo circuit in flow communication with said storage tank and configured to:
receive fuel gas from said storage tank;
convert the fuel gas into a gas and liquid mixture having a predetermined liquid to gas ratio by compressing the fuel gas to produce heated fuel gas, cool the heated fuel gas to produce cooled fuel gas and first waste heat, and expand the cooled fuel gas to produce the gas and liquid mixture, said cryo circuit comprising a fan that provides a cooling flow to control cooling of the heated fuel gas; and
discharge the gas and liquid mixture into said storage tank;
a power turbine configured to power the cryo circuit at least in part using a portion of the heated fuel gas downstream of the compression, the first waste heat, and power turbine waste heat extracted by communication with the fan;
a differential pressure sensor configured to monitor a differential pressure across walls of the storage tank; and
a controller communicatively coupled between said differential pressure sensor and said fan, said controller configured to control cooling of the heated fuel gas to achieve the predetermined liquid to gas ratio by transmitting signals to said fan that cause said fan to at least one of increase and decrease the cooling flow wherein said cryo circuit further comprises: a compressor configured to compress the fuel gas to produce the heated fuel gas; a heat exchanger in flow communication with said compressor and configured to cool the heated fuel gas to produce the cooled fuel gas and the first waste heat, said heat exchanger receiving the cooling flow from said fan; and a turbine in flow communication with said heat exchanger and configured to expand the cooled fuel gas to produce the gas and liquid mixture.

6. The cryogenic system in accordance with claim 5, wherein said cryo circuit is configured to discharge the gas and liquid mixture into said storage tank such that a pressure in an ullage space of said storage tank remains substantially constant.

7. The cryogenic system in accordance with claim 5, wherein said cryo circuit further comprises:
a compressor configured to compress the fuel gas to produce the heated fuel gas;
a heat exchanger in flow communication with said compressor and configured to cool the heated fuel gas to produce the cooled fuel gas and the first waste heat, said heat exchanger receiving the cooling flow from said fan; and
a turbine in flow communication with said heat exchanger and configured to expand the cooled fuel gas to produce the gas and liquid mixture.

8. The cryogenic system in accordance with claim 6, wherein said controller is configured to:
instruct said fan to increase the cooling flow when the pressure in the ullage space increases; and
instruct said fan to decrease the cooling flow when the pressure in the ullage space decreases.

9. The cryogenic system in accordance with claim 5, wherein:
the power turbine is further configured to power at least one of said compressor, said turbine, and said fan.

10. The cryogenic system in accordance with claim 5, wherein the fuel gas is natural gas.

11. The cryogenic system in accordance with claim 5, wherein said controller is configured to:
receive signals from said differential pressure sensor;
determine, from the received signals, whether the pressure within an ullage space is increasing or decreasing; and
transmit signals to said fan based on the determination.

* * * * *